United States Patent
Tucker et al.

(10) Patent No.: US 11,034,438 B2
(45) Date of Patent: Jun. 15, 2021

(54) SENSOR FOR MONITORING ROTORS

(71) Applicant: Bell Helicopter Textron Inc., Fort Worth, TX (US)

(72) Inventors: Brian Edward Tucker, Fort Worth, TX (US); Glenn Alan Shimek, Kennedale, TX (US); Leonard N. Jones, Fort Worth, TX (US); Joseph Wendelsdorf, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 375 days.

(21) Appl. No.: 16/192,901

(22) Filed: Nov. 16, 2018

(65) Prior Publication Data
US 2020/0156774 A1 May 21, 2020

(51) Int. Cl.
| | |
|---|---|
| *B64C 27/00* | (2006.01) |
| *B64C 27/12* | (2006.01) |
| *B64C 27/32* | (2006.01) |
| *G01M 13/028* | (2019.01) |
| *G01M 13/045* | (2019.01) |

(52) U.S. Cl.
CPC ........... *B64C 27/006* (2013.01); *B64C 27/12* (2013.01); *B64C 27/32* (2013.01); *G01M 13/028* (2013.01); *G01M 13/045* (2013.01)

(58) Field of Classification Search
CPC ..... B64C 27/006; B64C 27/008; B64C 27/04; B64C 27/06; B64C 27/32; G01M 3/028; G01M 3/045
See application file for complete search history.

(56) References Cited

U.S. PATENT DOCUMENTS

| | | | |
|---|---|---|---|
| 4,379,678 A | 4/1983 | Carlock et al. | |
| 8,123,177 B2 * | 2/2012 | Kummle | B64C 13/0425 244/236 |
| 9,701,420 B1 | 7/2017 | Tucker | |
| 10,023,304 B2 | 7/2018 | Dickman et al. | |
| 10,094,138 B2 * | 10/2018 | Gharabegian | F21V 23/0435 |
| 10,577,078 B2 * | 3/2020 | Chapman | G01P 3/481 |

(Continued)

FOREIGN PATENT DOCUMENTS

| | | |
|---|---|---|
| EP | 2433866 A2 | 3/2012 |
| EP | 2664545 A1 | 11/2013 |
| WO | 2016137536 A1 | 9/2016 |

OTHER PUBLICATIONS

European Patent Office, Communication pursuant to Article 94(3) EPC for EP Application No. 19153234.0 dated Dec. 2, 2019, 6 pp.

(Continued)

*Primary Examiner* — Courtney D Heinle
*Assistant Examiner* — Sang K Kim
(74) *Attorney, Agent, or Firm* — Daniel J. Chalker; Edwin S. Flores; Chalker Flores, LLP (57) ABSTRACT

A sensor for monitoring rotors includes a rotating shaft coupled to a set of rotor blades and a non-rotating tube at least partially disposed within the rotating shaft and coupled to the rotating shaft. The non-rotating tube includes a first end and a second end, a sensor mount disposed within the non-rotating tube proximate to the second end of the non-rotating tube. One or more sensors are attached to the sensor mount, wherein the one or more sensors detect one or more parameters associated with the rotating shaft or the set of rotor blades.

26 Claims, 7 Drawing Sheets

(56) References Cited

U.S. PATENT DOCUMENTS

| | | |
|---|---|---|
| 10,612,987 B2 * | 4/2020 | Atkins .................. B64D 45/00 |
| 2010/0116925 A1 | 5/2010 | Segal |
| 2014/0312722 A1 | 10/2014 | Raad |
| 2016/0200430 A1 | 7/2016 | Dickman et al. |
| 2020/0247529 A1 * | 8/2020 | Lauria .................. B64C 11/301 |

OTHER PUBLICATIONS

European Patent Office, Communication pursuant to Article 94(3) EPC for EP Application No. 19153234.0 dated Jul. 9, 2019, 7 pp.
European Patent Office, European Search Report for EP Appl. No. 19153234.0 dated Jun. 13, 2019, 6 pp.
Rule, et al. "Experimental Installation of Mast Mounted Sight on an OH-58C Helicopter" Nov. 3, 1980, XP055588798, URL:https://apps.dtic.mil/dtic/tr/fulltext/u2/a091074.pdf, 82 pp.

* cited by examiner

SENSOR FOR MONITORING ROTORS

CROSS-REFERENCE TO RELATED APPLICATIONS

Not applicable.

STATEMENT OF FEDERALLY FUNDED RESEARCH

Not applicable.

TECHNICAL FIELD OF THE INVENTION

The present invention relates in general to the field of rotorcraft, and more particularly to tail rotor sensors.

BACKGROUND OF THE INVENTION

Without limiting the scope of the invention, its background is described in connection with sensors for detecting faults in tail rotor controls.

Detecting faults in tail rotor controls has proven to be difficult due to continuing efforts to reduce the size and weight of tail rotor assemblies and the tail boom. As a result, tail rotor control faults are often detected using sensors mounted on the tail rotor gearbox, which is a long distance away from the tail rotor being monitored. These sensors usually detect problems in the tail rotor gearbox, which indirectly indicates a potential problem with the tail rotor. Accordingly, placing of a sensor proximate to the tail rotor is desirable.

SUMMARY OF THE INVENTION

In some embodiments of the disclosure, an apparatus comprises a rotating shaft coupled to a set of rotor blades, a non-rotating tube at least partially disposed within the rotating shaft and coupled to the rotating shaft, wherein the non-rotating tube comprises a first end and a second end, a sensor mount disposed within the non-rotating tube proximate to the second end of the non-rotating tube, and one or more sensors attached to the sensor mount, wherein the one or more sensors detect one or more parameters associated with the rotating shaft or the set of rotor blades. In one aspect, the one or more parameters comprise a vibration, a rotational speed, an acceleration, a temperature or a combination thereof; and the one or more sensors comprise a tachometer, a single axis accelerometer, a multiple axis accelerometer, a temperature sensor or a combination thereof. In another aspect, a Health and Usage Monitoring System (HUMS) is communicably coupled to the one or more sensors. In another aspect, one or more wires or cables, or a wireless transceiver are at least partially disposed within the non-rotating tube and coupled to the one or more sensors. In another aspect, an external sensor is attached to the sensor mount and positioned beyond the second end of the non-rotating tube. In another aspect, the sensor mount is cup-shaped and seals the second end of the non-rotating tube; and the sensor mount is attached to the non-rotating tube via an adhesive. In another aspect, the sensor mount includes a flange that mates with the second end of the non-rotating tube and controls a position of the sensor mount along the longitudinal axis of the non-rotating tube. In another aspect, a retention device affixes the sensor mount to the non-rotating tube, wherein the retention device comprises one or more cotter pins, a safety wire or a combination thereof. In another aspect, a set of bearings couples the non-rotating tube to the rotating shaft. In another aspect, a rotating standpipe is disposed between the rotating shaft and the non-rotating tube such that the non-rotating tube is coupled to the rotating standpipe and the rotating standpipe is coupled to the rotating shaft; and a control actuator is coupled proximate to the first end of the non-rotating tube, wherein the control actuator selectively moves the non-rotating tube along a longitudinal axis. In another aspect, the one or more sensors further detect a stickage and/or a slippage of the non-rotating tube. In another aspect, a clamp assembly is attached to an exterior of the non-rotating tube proximate to the second end of the non-rotating tube; a set of bearings couple the clamp assembly to the rotating standpipe; a crosshead is attached to an exterior of the rotating standpipe proximate to the set of bearings; a set of pitch link couple the set of rotor blades to the crosshead; and wherein the rotating standpipe is splined to the rotating shaft. In another aspect, at least one of the one or more sensors comprises an accelerometer; and the sensor mount and the accelerometer are positioned to create a vibration path between the set of bearings and the accelerometer.

In some embodiments of the disclosure, a method comprises providing a rotating shaft coupled to a set of rotor blades, a non-rotating tube at least partially disposed within the rotating shaft and coupled to the rotating shaft, wherein the non-rotating tube comprises a first end and a second end, a sensor mount disposed within the non-rotating tube proximate to the second end of the non-rotating tube, and one or more sensors attached to the sensor mount; and detecting one or more parameters associated with the rotating shaft or the set of rotor blades rotor using the one or more sensors. In one aspect, the one or more parameters comprise a vibration, a rotational speed, an acceleration, a temperature or a combination thereof; and the one or more sensors comprise a tachometer, a single axis accelerometer, a multiple axis accelerometer, a temperature sensor or a combination thereof. In another aspect, providing the one or more sensors comprises attaching the one or more sensors to the sensor mount; and providing the sensor mount comprises installing the sensor mount within the non-rotating tube proximate to the second end of the non-rotating tube. In another aspect, the method further comprises providing a set of bearings coupling the non-rotating tube to the rotating shaft. In another aspect, the method further comprises positioning an external sensor beyond the second end of the non-rotating tube and attaching the external sensor to the sensor mount. In another aspect, the method further comprises providing one or more wires or cables, or a wireless transceiver at least partially disposed within the non-rotating tube and coupled to the one or more sensors. In another aspect, the sensor mount is cup-shaped and seals the second end of the non-rotating tube; and the sensor mount is attached to the non-rotating tube via an adhesive. In another aspect, the method further comprises affixing the sensor mount to the non-rotating tube using a retention device, wherein the retention device comprises one or more cotter pins, a safety wire or a combination thereof. In another aspect, the method further comprises providing a rotating standpipe between the rotating shaft and the non-rotating tube such that the non-rotating tube is coupled to the rotating standpipe and the rotating standpipe is coupled to the rotating shaft; providing a control actuator coupled proximate to the first end of the non-rotating tube; and selectively moving the non-rotating tube along a longitudinal axis using the control actuator. In another aspect, the method further comprises detecting a stickage and/or a slippage of the non-rotating tube using the one or more sensors. In another aspect, the method further comprises providing a clamp assembly attached to an exterior of the non-rotating tube proximate to the second end of the non-rotating tube; providing a set of bearings coupling the clamp assembly to the rotating standpipe; providing a crosshead attached to an exterior of the rotating standpipe proximate to the set of bearings; providing a set of pitch link coupling the set of rotor blades to the crosshead; and wherein the rotating standpipe is splined to the rotating shaft. In another aspect, at least one of the one or more sensors comprises an accelerometer; and the retention device and the accelerometer are positioned to create a vibration path between the set of bearings and the accelerometer.

In some embodiments of the disclosure, a rotor assembly comprises: a gearbox; a set of rotor blades; a rotating shaft having a first end operably coupled to the gearbox and a second end operably coupled to the set of rotor blades; a rotating standpipe disposed at least partially within the rotating shaft and coupled to the rotating shaft; a non-rotating tube at least partially disposed within the rotating standpipe and coupled to the rotating standpipe, wherein the non-rotating tube comprises a first end extending through the gearbox, a second end extending beyond the second end of the rotating shaft, and a longitudinal axis; a sensor mount disposed within the non-rotating tube proximate to the second end of the non-rotating tube; one or more sensors attached to the sensor mount, wherein the one or more sensors detect one or more parameters associated with the rotating shaft, the rotating standpipe or the set of rotor blades; one or more wires or cables at least partially disposed within the non-rotating tube, wherein the one or more wires or cables comprise a first end extending through the first end of the non-rotating tube and a second end coupled to the one or more sensors; a clamp assembly attached to an exterior of the non-rotating tube proximate to the second end of the non-rotating tube; a set of bearings coupling the clamp assembly to the rotating standpipe; a crosshead attached to an exterior of the rotating standpipe proximate to the set of bearings; a set of pitch links coupling the set of rotor blades to the crosshead; and a control actuator coupled to the first end of the non-rotating tube, wherein the control actuator adjusts a pitch of the set of rotor blades by selectively moving the non-rotating tube along the longitudinal axis.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. The aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
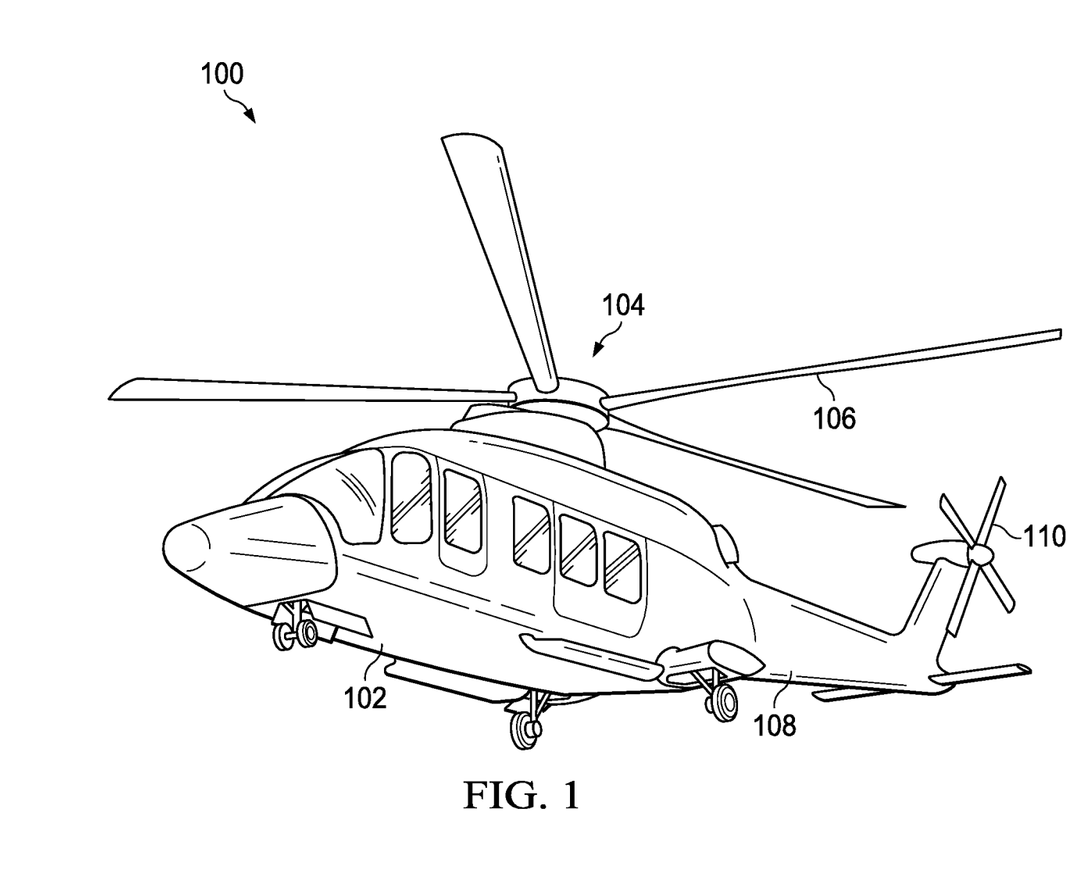
FIG. 1 shows a perspective view of a helicopter in accordance with one embodiment of the present application.
Figure 2:
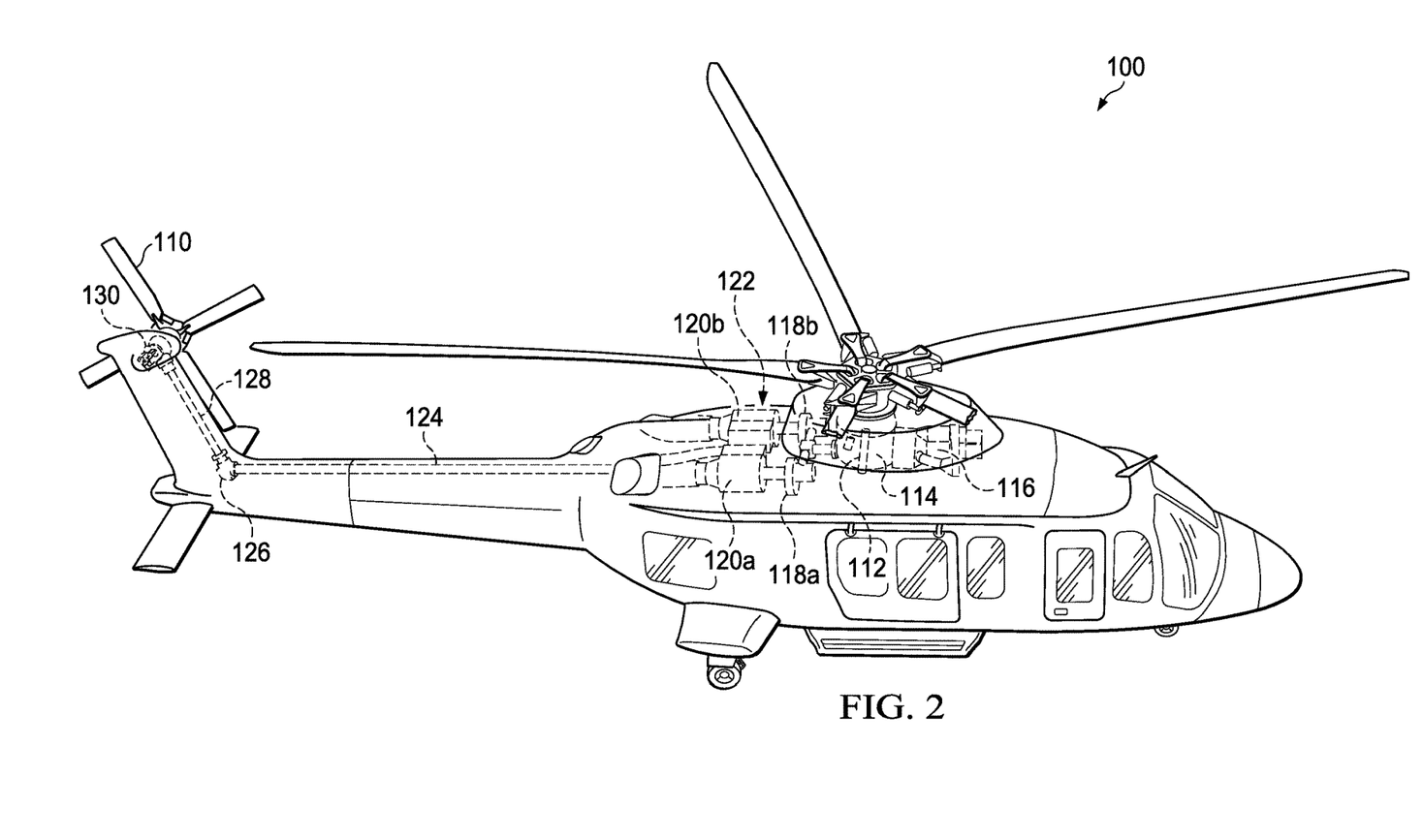
FIG. 2 shows a partial cross-section, perspective view of a helicopter in accordance with one embodiment of the present application.

FIG. 1 shows perspective view of a helicopter 100 in accordance with one embodiment of the present application. In the exemplary embodiment, helicopter 100 has a fuselage 102 and a rotor system 104 carried thereon. A plurality of rotor blades 106 is operably associated with a rotor system 104 for creating flight. A tail boom 108 is depicted that further includes tail rotor 110. Note that the present invention is not limited to helicopters and is applicable to other rotor propelled manned or unmanned aircraft including drones For example, FIG. 2 shows a partial cross-section perspective view of helicopter 100 that includes additional detail of the present invention. Helicopter 100 further includes a rotor mast 112, which is connected to the main rotor gearbox (MRGB) 114. The MRGB 114 is connected to one or more accessory gear boxes 116 and one or more reduction gearboxes (RGB) 118a, 118b, hydraulic pump(s)

and generator(s). Each RGB 118a, 118b is connected to one or more engines 120a, 120b, which are within an engine compartment 122. A first tail rotor drive shaft 124 connects the MRGB 114 to an intermediate gearbox 126 and transmits mechanical rotation to the intermediate gearbox 126. A second tail rotor drive shaft 128 connects the intermediate gearbox 126 to the tail rotor gearbox 130 and transmits mechanical rotation to the tail rotor gearbox 130. The tail rotor gearbox 130 drives the tail rotor 110. Note that in some aircraft, the intermediate gearbox 126 and the second tail rotor drive shaft 128 are not necessary. Moreover in some aircraft, the first tail rotor drive shaft 124 and tail rotor gearbox 130 are not necessary when electrical power or hydraulic power is used to drive the tail rotor 110.

As will be explained in more detail below, the sensor described herein is applicable to any tail rotor assembly regardless of how it is driven (i.e., mechanical, electrical, hydraulic, etc.) as long as the tail rotor assembly includes a non-rotating tube disposed within and coupled to the rotating shaft driving the tail rotor or a rotating standpipe coupled to the rotating shaft. Moreover, the sensor is described with respect to mechanically driven tail rotor systems, but those skilled in the art will recognize that the sensor is not limited to any specific type of drive system or even to tail rotors. The following non-limiting example describes a tail rotor assembly that includes adjustable pitch blades, but the sensor described herein is also applicable to fixed pitch blades.

Figure 3:
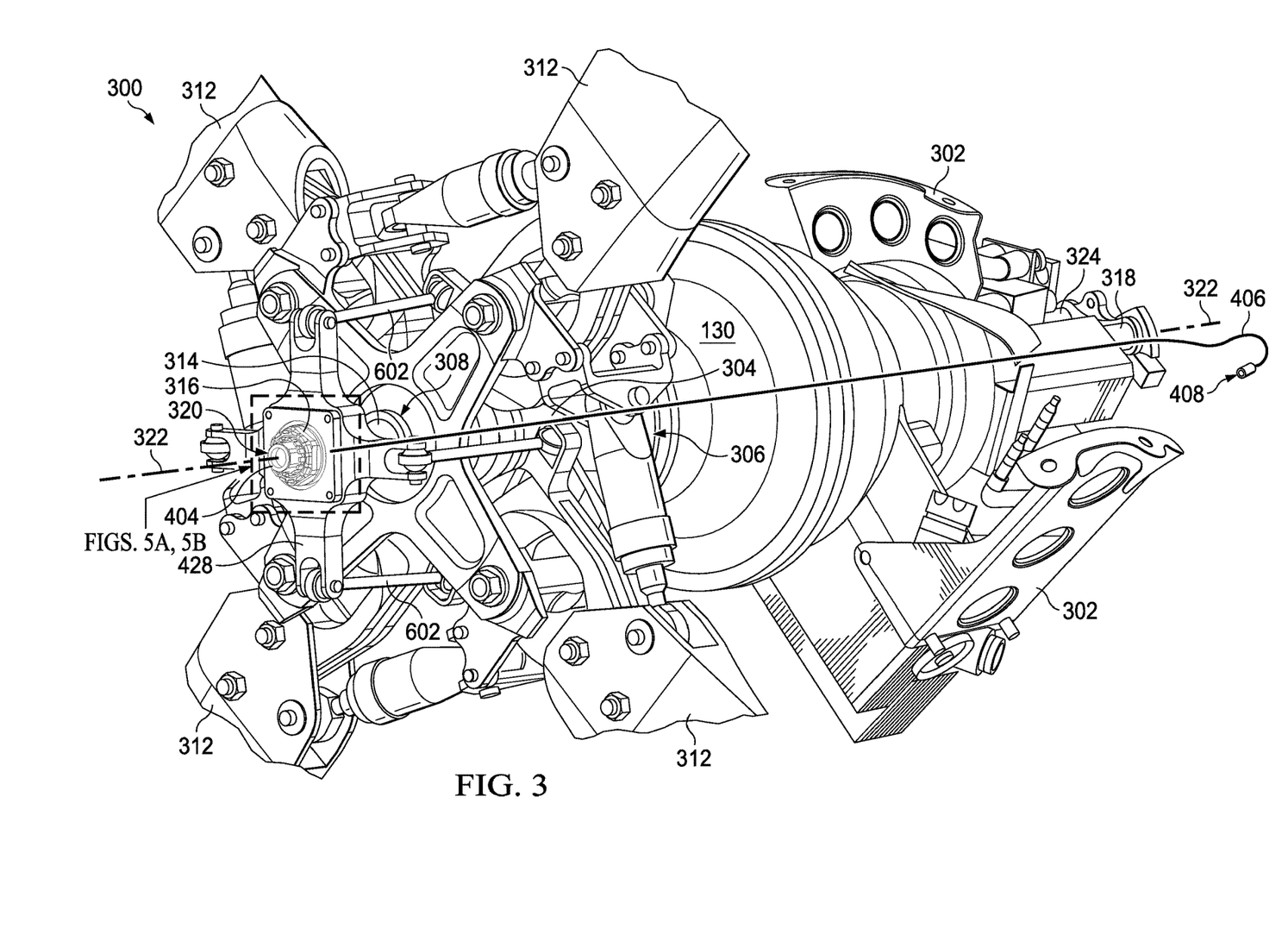
FIG. 3 shows a tail rotor assembly with the tail boom fuselage removed in accordance with one embodiment of the present invention.

FIG. 3 shows a tail rotor assembly 300 with the tail boom fuselage removed in accordance with one embodiment of the present invention. The tail rotor assembly 300 includes the tail rotor gearbox 130 mounted on the tail boom frame 302. A rotating shaft or mast 304 has a first end 306 operably coupled to the tail rotor gearbox 130 and a second end 308 operably coupled to the set of rotor blades 312. Although four rotor blades 312 are shown, other tail rotor assemblies may include as few as two or more than four rotor blades. A rotating standpipe 314 is disposed at least partially within the rotating shaft 304 and coupled to the rotating shaft 304. Typically, the rotating standpipe 314 is splined to the rotating shaft 304. A non-rotating tube 316, otherwise referred to as a control tube, is at least partially disposed within the rotating standpipe 314 and coupled to the rotating standpipe 314. The non-rotating tube 316 includes a first end 318 that extends through the tail rotor gearbox 130, a second end 320 extending beyond the second end 308 of the rotating shaft 304, and a longitudinal axis 322.

Figure 4:
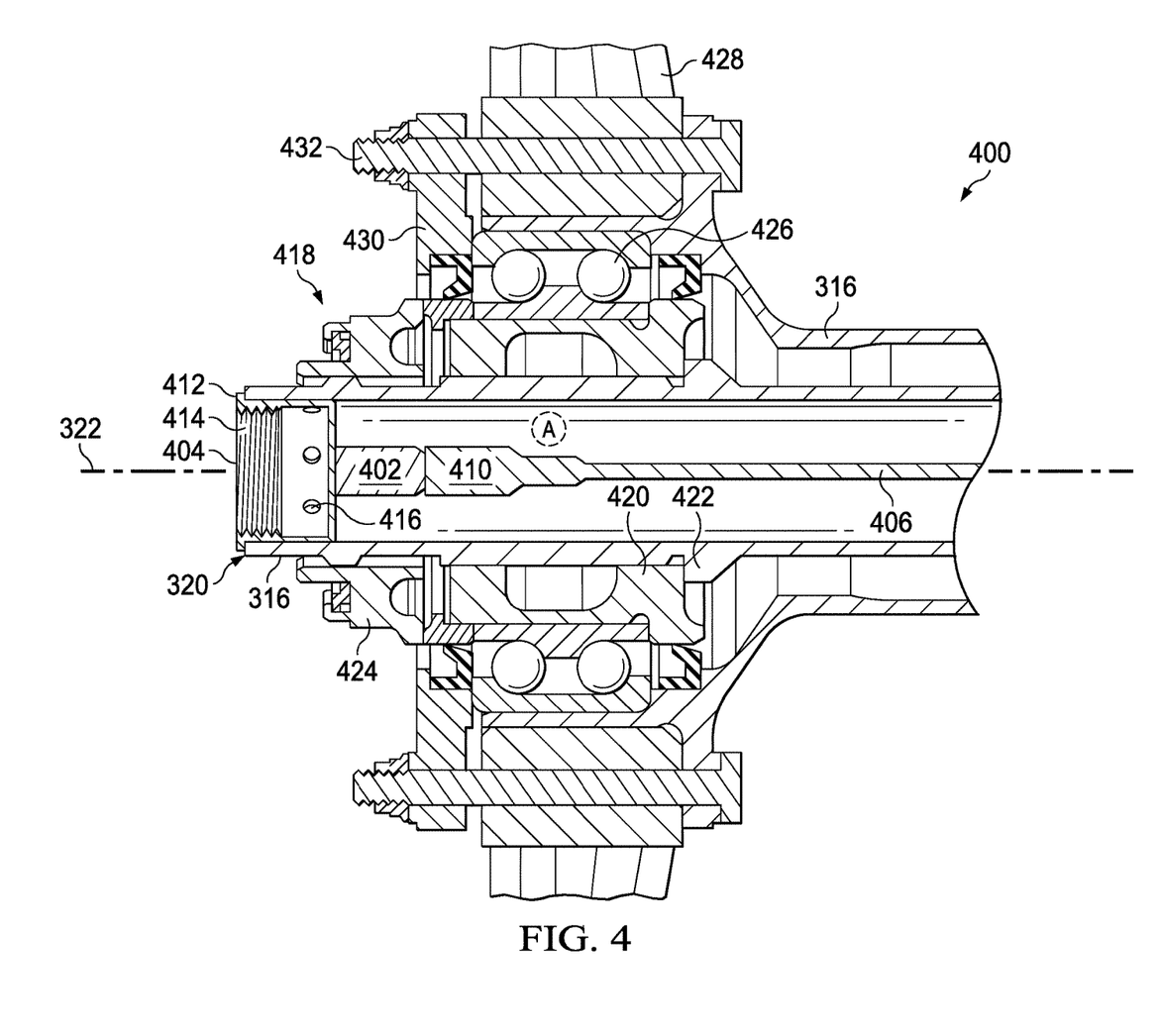
FIG. 4 shows a cross-sectional view of a tail rotor pitch control assembly with one or more sensors in accordance with one embodiment of the present invention.

Now referring to both FIGS. 3 and 4, FIG. 4 shows a cross-sectional view of a tail rotor pitch control assembly 400 with one or more sensors 402 in accordance with one embodiment of the present invention. A sensor mount 404 is disposed within the non-rotating tube 316 proximate to the second end 320 of the non-rotating tube 316. The one or more sensors 402 are attached to the sensor mount 404 within the non-rotating tube 316. In some embodiments, external sensor(s) may be attached to the sensor mount 404 and positioned beyond the second end 320 of the non-rotating tube 316. The one or more sensors 402 detect one or more parameters associated with the rotating shaft 304, the rotating standpipe 314 or the set of rotor blades 312. The one or more parameters may include, but are not limited to, a vibration, a rotational speed, an acceleration, a temperature or a combination thereof. The one or more sensors 402 may include, but are not limited to, a tachometer, a single axis accelerometer, a multiple axis accelerometer, a temperature sensor or a combination thereof. The one or more sensors 402 can be communicably coupled to a Health and Usage Monitoring System (HUMS) or other computer/system. An example of HUMS is described in U.S. Pat. No. 9,701,420, which is hereby incorporated by reference in its entirety. One or more wires or cables 406 are at least partially disposed within the non-rotating tube 316 and have a first end 408 extending through the first end 318 of the non-rotating tube 316 and a second end 410 coupled to the one or more sensors 402. The first end 408 and/or second end 410 may include connectors, wiring harnesses or other forms of electrical or data connection. Note that the one or more wires or cables 406 can be replaced with wireless transceivers or other devices to communicate sensor data to a control computer, HUMS, pilot or ground control.

Figure 5A:
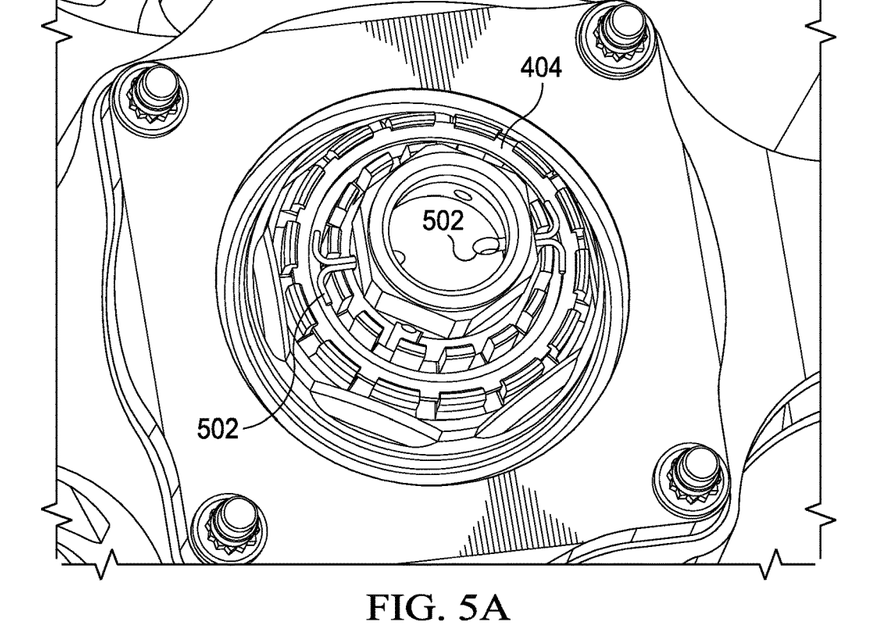
FIGS. 5A and 5B show the sensor mount 404 affixed to the non-rotating tube using various retention devices.
Figure 5B:
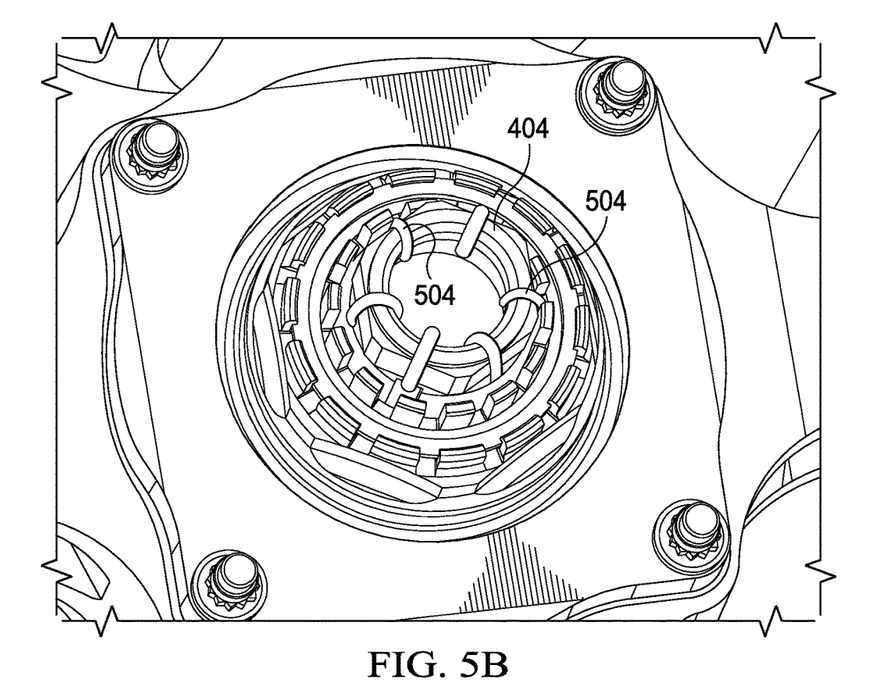

In this non-limiting example, the sensor mount 404 is cup-shaped having a flange 412, inner threads 414 and holes 416. The flange 412 mates with the second end 320 of the non-rotating tube 316 and is used to control the position of the sensor mount along the longitudinal axis 322 of the non-rotating tube. The sensor mount 404 is attached or bonded to the non-rotating tube 316 with an adhesive and/or other types of fasteners (e.g., retention devices described below), and seals the second end 320 of the non-rotating tube 316. The outer diameter of the sensor mount 404 fits inside the inner diameter of the non-rotating tube 316. As shown in FIGS. 5A and 5B, the sensor mount 404 can also be affixed to the non-rotating tube 316 using a retention device, such as one or more cotter pins 502, safety wire 504 or a combination thereof secured through the holes 416 of the sensor mount 404. The retention device can be used in addition to the adhesive.

A clamp assembly 418 is attached to an exterior of the non-rotating tube 316 proximate to the second end 320 of the non-rotating tube 316. The clamp assembly 418 includes a spacer/bearing clamp 420 secured between a flange 422 on the non-rotating tube 316 and a non-rotating clamp nut 424. A set of bearings 426 couples the clamp assembly 418 to the rotating standpipe 314. A crosshead 428 is attached to an exterior of the rotating standpipe 314 proximate to the set of bearings 426 with a crosshead clamp plate 430 and crosshead attach bolts 432.

Figure 6:
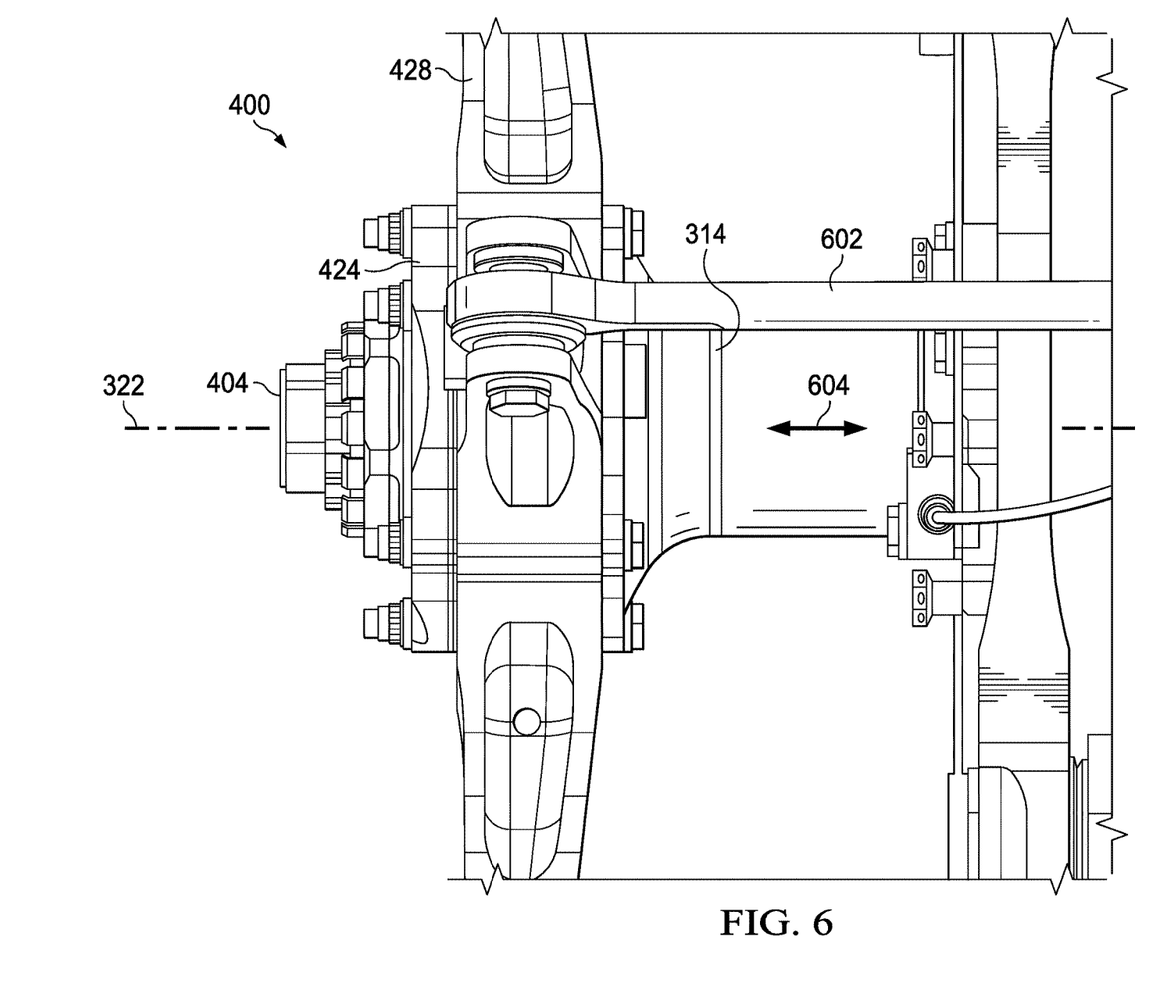
FIG. 6 illustrates the operation of the tail rotor pitch control assembly in accordance with one embodiment of the present invention.

Now referring to FIGS. 3, 4 and 6, FIG. 6 illustrates the operation of the tail rotor pitch control assembly 400 in accordance with one embodiment of the present invention. A set of pitch links 602 couple the set of rotor blades 312 to the crosshead 428. A control actuator 324 located on the other end of the tail rotor gearbox 130 is coupled to the first end 318 of the non-rotating tube 316. The control actuator 324 adjusts a pitch of the set of rotor blades 312 and thus thrust by selectively moving the non-rotating tube 316 along the longitudinal axis 322 (inboard/outboard), which in turn moves the rotating standpipe 314 as indicated by arrow 604. An example of a tail rotor actuation system is described in U.S. Pat. No. 10,023,304, which is hereby incorporated by reference in its entirety. In some cases, the one or more sensors 402 can be a single axis accelerometer that detects vibrations, which may indicate a component fault, in the set of bearings 426 or transmitted to the set of bearings 426 via a vibration path from the crosshead 428, pitch links 602 or rotor blades 312. The vibration path between the set of bearings and the one or more sensors 402 can be reduced or minimized by using an elongated sensor mount 404 to position the one or more sensors 402 closer to the area identified by the circle A. In other cases, the one or more sensors 402 can be a two axis accelerometer that detects vibrations as described above and a stickage and/or a slippage of the non-rotating tube 316.

As will be understood by those skilled in the art, the present invention can be used with a rotor having fixed pitch blades by coupling the non-rotating tube 316 to the rotating shaft 304 instead of the rotating standpipe 314.

Figure 7:
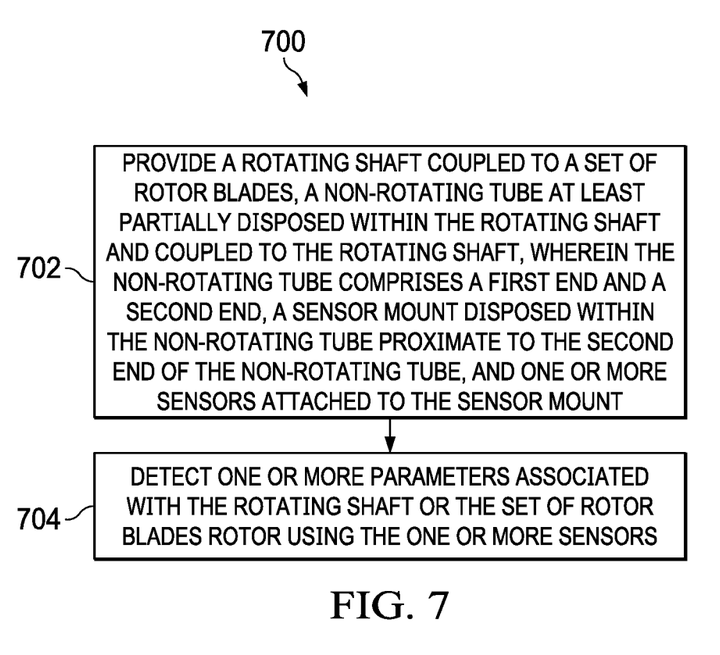
FIG. 7 is a flowchart depicting a method for detecting one or more parameters associated with the rotating shaft or the set of rotor blades rotor using one or more sensors in accordance with one embodiment of the present invention.

FIG. 7 is a flowchart depicting a method 700 for detecting one or more parameters associated with the rotating shaft or the set of rotor blades rotor using one or more sensors in accordance with one embodiment of the present invention. The method 700 includes providing a rotating shaft coupled to a set of rotor blades, a non-rotating tube at least partially disposed within the rotating shaft and coupled to the rotating shaft, wherein the non-rotating tube comprises a first end and a second end, a sensor mount disposed within the non-rotating tube proximate to the second end of the non-rotating tube, and one or more sensors attached to the sensor mount in block 702. One or more parameters associated with the rotating shaft or the set of rotor blades rotor are detected using the one or more sensors in block 704.

In one aspect, the one or more parameters comprise a vibration, a rotational speed, an acceleration, a temperature or a combination thereof; and the one or more sensors comprise a tachometer, a single axis accelerometer, a multiple axis accelerometer, a temperature sensor or a combination thereof. In another aspect, providing the one or more sensors comprises attaching the one or more sensors to the sensor mount; and providing the sensor mount comprises installing the sensor mount within the non-rotating tube proximate to the second end of the non-rotating tube. In another aspect, the method further comprises providing a set of bearings coupling the non-rotating tube to the rotating shaft. In another aspect, the method further comprises positioning an external sensor beyond the second end of the non-rotating tube and attaching the external sensor to the sensor mount. In another aspect, the method further comprises providing one or more wires or cables, or a wireless transceiver at least partially disposed within the non-rotating tube and coupled to the one or more sensors. In another aspect, the sensor mount is cup-shaped and seals the second end of the non-rotating tube; and the sensor mount is attached to the non-rotating tube via an adhesive. In another aspect, the method further comprises affixing the sensor mount to the non-rotating tube using a retention device, wherein the retention device comprises one or more cotter pins, a safety wire or a combination thereof. In another aspect, the method further comprises providing a rotating standpipe between the rotating shaft and the non-rotating tube such that the non-rotating tube is coupled to the rotating standpipe and the rotating standpipe is coupled to the rotating shaft; providing a control actuator coupled proximate to the first end of the non-rotating tube; and selectively moving the non-rotating tube along a longitudinal axis using the control actuator. In another aspect, the method further comprises detecting a stickage and/or a slippage of the non-rotating tube using the one or more sensors. In another aspect, the method further comprises providing a clamp assembly attached to an exterior of the non-rotating tube proximate to the second end of the non-rotating tube; providing a set of bearings coupling the clamp assembly to the rotating standpipe; providing a crosshead attached to an exterior of the rotating standpipe proximate to the set of bearings; providing a set of pitch link coupling the set of rotor blades to the crosshead; and wherein the rotating standpipe is splined to the rotating shaft. In another aspect, at least one of the one or more sensors comprises an accelerometer; and the retention device and the accelerometer are positioned to create a vibration path between the set of bearings and the accelerometer.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. An apparatus comprising:
   a rotating shaft coupled to a set of rotor blades;
   a non-rotating tube at least partially disposed within the rotating shaft and coupled to the rotating shaft, wherein the non-rotating tube comprises a first end and a second end;
   a sensor mount disposed within the non-rotating tube proximate to the second end of the non-rotating tube; and
   one or more sensors attached to the sensor mount, wherein the one or more sensors detect one or more parameters associated with the rotating shaft or the set of rotor blades.

2. The apparatus of claim 1, wherein:
   the one or more parameters comprise a vibration, a rotational speed, an acceleration, a temperature or a combination thereof; and
   the one or more sensors comprise a tachometer, a single axis accelerometer, a multiple axis accelerometer, a temperature sensor or a combination thereof.

3. The apparatus of claim 1, further comprising a Health and Usage Monitoring System (HUMS) communicably coupled to the one or more sensors.

4. The apparatus of claim 1, further comprising one or more wires or cables, or a wireless transceiver at least partially disposed within the non-rotating tube and coupled to the one or more sensors.

5. The apparatus of claim 1, further comprising an external sensor attached to the sensor mount and positioned beyond the second end of the non-rotating tube.

6. The apparatus of claim 1, wherein:
   the sensor mount is cup-shaped and seals the second end of the non-rotating tube; and
   the sensor mount is attached to the non-rotating tube via an adhesive.

7. The apparatus of claim 1, wherein the sensor mount includes a flange that mates with the second end of the non-rotating tube and controls a position of the sensor mount along a longitudinal axis of the non-rotating tube.

8. The apparatus of claim 1, further comprising a retention device affixing the sensor mount to the non-rotating tube, wherein the retention device comprises one or more cotter pins, a safety wire or a combination thereof.

9. The apparatus of claim 1, further comprising a set of bearings coupling the non-rotating tube to the rotating shaft.

10. The apparatus of claim 1, further comprising:
    a rotating standpipe disposed between the rotating shaft and the non-rotating tube such that the non-rotating tube is coupled to the rotating standpipe and the rotating standpipe is coupled to the rotating shaft; and
    a control actuator coupled proximate to the first end of the non-rotating tube, wherein the control actuator selectively moves the non-rotating tube along a longitudinal axis.

11. The apparatus of claim 10, wherein the one or more sensors further detect a stickage and/or a slippage of the non-rotating tube.

12. The apparatus of claim 10, further comprising:
    a clamp assembly attached to an exterior of the non-rotating tube proximate to the second end of the non-rotating tube;
    a set of bearings coupling the clamp assembly to the rotating standpipe;
    a crosshead attached to an exterior of the rotating standpipe proximate to the set of bearings;
    a set of pitch link coupling the set of rotor blades to the crosshead; and
    wherein the rotating standpipe is splined to the rotating shaft.

13. The apparatus of claim 12, wherein:
    at least one of the one or more sensors comprises an accelerometer; and
    the sensor mount and the accelerometer are positioned to create a vibration path between the set of bearings and the accelerometer.

14. A method comprising:
    providing a rotating shaft coupled to a set of rotor blades, a non-rotating tube at least partially disposed within the rotating shaft and coupled to the rotating shaft, wherein the non-rotating tube comprises a first end and a second end, a sensor mount disposed within the non-rotating tube proximate to the second end of the non-rotating tube, and one or more sensors attached to the sensor mount; and
    detecting one or more parameters associated with the rotating shaft or the set of rotor blades rotor using the one or more sensors.

15. The method of claim 14, wherein:
the one or more parameters comprise a vibration, a rotational speed, an acceleration, a temperature or a combination thereof; and
the one or more sensors comprise a tachometer, a single axis accelerometer, a multiple axis accelerometer, a temperature sensor or a combination thereof.

16. The method of claim 14, wherein:
providing the one or more sensors comprises attaching the one or more sensors to the sensor mount; and
providing the sensor mount comprises installing the sensor mount within the non-rotating tube proximate to the second end of the non-rotating tube.

17. The method of claim 14, further comprising providing a set of bearings coupling the non-rotating tube to the rotating shaft.

18. The method of claim 14, further comprising positioning an external sensor beyond the second end of the non-rotating tube and attaching the external sensor to the sensor mount.

19. The method of claim 14, further comprising providing one or more wires or cables, or a wireless transceiver at least partially disposed within the non-rotating tube and coupled to the one or more sensors.

20. The method of claim 14, wherein:
the sensor mount is cup-shaped and seals the second end of the non-rotating tube; and
the sensor mount is attached to the non-rotating tube via an adhesive.

21. The method of claim 14, further comprising affixing the sensor mount to the non-rotating tube using a retention device, wherein the retention device comprises one or more cotter pins, a safety wire or a combination thereof.

22. The method of claim 14, further comprising:
providing a rotating standpipe between the rotating shaft and the non-rotating tube such that the non-rotating tube is coupled to the rotating standpipe and the rotating standpipe is coupled to the rotating shaft;
providing a control actuator coupled proximate to the first end of the non-rotating tube; and
selectively moving the non-rotating tube along a longitudinal axis using the control actuator.

23. The method of claim 22, further comprising detecting a stickage and/or a slippage of the non-rotating tube using the one or more sensors.

24. The method of claim 22, further comprising:
providing a clamp assembly attached to an exterior of the non-rotating tube proximate to the second end of the non-rotating tube;
providing a set of bearings coupling the clamp assembly to the rotating standpipe;
providing a crosshead attached to an exterior of the rotating standpipe proximate to the set of bearings;
providing a set of pitch link coupling the set of rotor blades to the crosshead; and
wherein the rotating standpipe is splined to the rotating shaft.

25. The method of claim 24, wherein:
at least one of the one or more sensors comprises an accelerometer; and
the retention device and the accelerometer are positioned to create a vibration path between the set of bearings and the accelerometer.

26. A rotor assembly comprising:
a gearbox;
a set of rotor blades;
a rotating shaft having a first end operably coupled to the gearbox and a second end operably coupled to the set of rotor blades;
a rotating standpipe disposed at least partially within the rotating shaft and coupled to the rotating shaft;
a non-rotating tube at least partially disposed within the rotating standpipe and coupled to the rotating standpipe, wherein the non-rotating tube comprises a first end extending through the gearbox, a second end extending beyond the second end of the rotating shaft, and a longitudinal axis;
a sensor mount disposed within the non-rotating tube proximate to the second end of the non-rotating tube;
one or more sensors attached to the sensor mount, wherein the one or more sensors detect one or more parameters associated with the rotating shaft, the rotating standpipe or the set of rotor blades;
one or more wires or cables at least partially disposed within the non-rotating tube, wherein the one or more wires or cables comprise a first end extending through the first end of the non-rotating tube and a second end coupled to the one or more sensors;
a clamp assembly attached to an exterior of the non-rotating tube proximate to the second end of the non-rotating tube;
a set of bearings coupling the clamp assembly to the rotating standpipe;
a crosshead attached to an exterior of the rotating standpipe proximate to the set of bearings;
a set of pitch links coupling the set of rotor blades to the crosshead; and
a control actuator coupled to the first end of the non-rotating tube, wherein the control actuator adjusts a pitch of the set of rotor blades by selectively moving the non-rotating tube along the longitudinal axis.

* * * * *